US006470828B1

(12) United States Patent
Townsend et al.

(10) Patent No.: US 6,470,828 B1
(45) Date of Patent: Oct. 29, 2002

(54) ANIMAL WASTE MANAGEMENT SYSTEM AND METHOD THEREOF

(75) Inventors: David Allen Townsend, Liberty, MO (US); James H. Freiss, Snellville, GA (US); Joel Willis Sneed, Omaha, NE (US); Brian Paulsen, Trenton, MO (US); Alfred Stewart, Cartersville, GA (US)

(73) Assignee: Premium Standard Farms, Inc., Kansas City, MO (US)

( * ) Notice: Subject to any disclaimer, the term of this patent is extended or adjusted under 35 U.S.C. 154(b) by 0 days.

(21) Appl. No.: 09/595,702

(22) Filed: Jun. 16, 2000

(51) Int. Cl.$^7$ ............................................. A01K 1/01
(52) U.S. Cl. ..................... 119/447; 119/450; 209/17; 209/10
(58) Field of Search ................. 119/450, 447, 119/527, 451, 479, 436; 209/17, 10, 12.1, 13

(56) References Cited

U.S. PATENT DOCUMENTS

| 3,137,270 A | 6/1964 | Rigterink et al. |
| 3,175,535 A | 3/1965 | Rigterink |
| 3,633,547 A | 1/1972 | Stevens |
| 4,175,515 A | 11/1979 | Bradley |
| 4,353,328 A | 10/1982 | Steidinger |
| 4,402,282 A | 9/1983 | Steidinger |
| 5,062,387 A | 11/1991 | Anderson |
| 5,890,454 A | 4/1999 | Moore, Jr. |
| 5,950,565 A | 9/1999 | Guyot |
| 6,083,386 A | * 7/2000 | Lloyd .......................... 119/527 |
| 6,190,566 B1 | * 2/2001 | Kolber ........................ 210/744 |

FOREIGN PATENT DOCUMENTS

| JP | 404036131 A | * 2/1992 | ................. 119/436 |

* cited by examiner

Primary Examiner—Peter M. Poon
Assistant Examiner—T. D. Collins
(74) Attorney, Agent, or Firm—Blackwell Sanders Peper Martin LLP

(57) ABSTRACT

An animal waste management system and method thereof is disclosed. The system is designed for use in high flush waste removal systems, but obviates the need for anaerobic lagoons when coupled to an advanced waste treatment facility. The system uses a continuous recycle loop of the waste slurry to increase the total solids concentration of the waste slurry to a level required by advanced waste treatment facilities. In particular, coarse solids are separated and removed from the recycled waste slurry to prevent clogging of the system. Aeration and pH control of the waste slurry when necessary prevents deterioration of the air quality surrounding the system.

21 Claims, 2 Drawing Sheets

ANIMAL WASTE MANAGEMENT SYSTEM AND METHOD THEREOF

FIELD OF THE INVENTION

The present invention relates in general to an animal waste management system and method thereof and more particularly to a hog waste management system and method thereof for waste management systems which provide for continuous recycling of animal waste slurry such that a highly concentrated waste slurry is produced.

BACKGROUND OF THE INVENTION

Two of the primary systems utilized in the hog industry to remove animal waste from animal confinement barns are the high volume flush system and pull plug system. In high volume flush systems, the water introduced for livestock watering, cleaning, and cooling mixes with solid excrement from the animals to produce a waste slurry. Without dilution, the slurry concentration generated by the hogs ranges from 3–9% total solids depending upon water management practices used by the hog producer. Designed to improve air quality in the confinement barns and to convey manure slurry from the barns, the high volume recycle system intentionally dilutes the waste slurry with recycled surface water from large ambient temperature anaerobic lagoons or other downstream treatment/storage units so that the waste slurry flushed from the barns contains typically less than 0.5% total solids. In pull plug systems, a large volume of pit recharge water is recycled in a similar fashion for similar reasons so that the waste slurry again contains less total solids (typically 0.5–2%) when flushed from the barns.

A problem associated with ambient temperature anaerobic lagoon systems is the accumulation of soluble salts. Long term storage and recycling of lagoon wastewater allows the accumulated liquor to reach saturation in sparingly soluble salts, primarily struvite (magnesium ammonium phosphate). These salts deposit in recycle and recharge pumps and piping systems and require routine removal for proper system operation. The removal of the accumulated salts in conventional systems is very costly. In systems where the problem becomes chronic, the system is often reconfigured to provide two parallel systems so that one can be operated while the other is cleaned with acid to remove the salt deposits.

Flush systems and pull plug systems, use relatively large volumes of dilute recycle/recharge wastewater from down stream treatment/storage processes to convey waste. Thus the flow rates from confinement buildings utilizing these existing technologies are as much as 30 fold higher than the actual slurry production rate of the animals. This low concentration of waste slurry causes prohibitively high capital and operating costs when attempting to retrofit these systems with advanced waste treatment technology. Advanced waste treatment technologies include but are not limited to anaerobic digestion gassification and chemical processing to produce commercially valuable fertilizer, fuel, or other products. The factors resulting in high operating and capital costs include but are not limited to the need for large vessel sizes, slurry temperature loss and high pump volumes. The only viable alternative to alleviate these problems is to modify existing barns with alternative waste collection systems. Until now, most producers could not justify the high cost of a system changeover.

Accordingly, the present invention is directed to overcoming one or more of the problems as set forth above.

SUMMARY OF THE INVENTION

An animal waste management system for handling a waste slurry having a plurality of coarse solids contained therein flushed from an animal confinement housing at a flush rate is disclosed. The system comprises separation means for separating the coarse solids from the waste slurry flushed from the animal confinement housing, removal means for removing a volume of the waste slurry produced from the separation means to produce a remaining volume of waste slurry, conditioning means for conditioning the remaining volume of waste slurry from the removal means to maintain air quality in the animal confinement housing, and recycling means for recycling the conditioned waste slurry through the waste management system at a recycle rate, which is preferably at least approximately ninety-five percent of the flush rate, whereby the removed volume of waste slurry has a high concentration of solids. The amount of solids in the removed waste slurry is preferably in the range of approximately four to eight percent. The separation means is preferably selected from the group consisting of a screen, a hydrocyclone, a chemical thickener, and a settling cone.

The conditioning means comprises an aerator adapted to aerate the remaining volume of waste slurry to prevent the formation of hydrogen sulfide, and a regulator adapted to regulate the pH of the remaining volume of waste slurry to prevent the emission of excess ammonia. The removal means comprises sedimentation means to segregate the waste slurry produced by the separation means such that the removed volume of waste slurry is more concentrated than the remaining volume of waste slurry. The sedimentation means is preferably a tank having a lower region and an upper region in which the remaining waste slurry is segregated such that the removed volume of waste slurry is allowed to settle toward the bottom region of the sedimentation tank, and the removal means is a valve or pump in communication with the lower region of the sedimentation tank. The sedimentation means may comprise a controller having a predetermined control level and a valve in communication with the controller, the valve being adapted to open when the level of the remaining waste slurry in the tank is equal to or greater than the predetermined control level and to close or turn off when the level of the remaining waste slurry in the tank is less than the predetermined control level.

The system may further comprise means for mixing the coarse solids separated by the separation means with the removed volume of waste slurry, and a stabilizer in communication with the animal confinement housing and the separation means, the stabilizer being adapted to stabilize the flow of waste slurry through the waste management system. The recycling means may comprise a recycle pump, and the conditioning means may comprise a controller in communication with the recycle pump, the controller being adapted to stop operation of the recycle pump when the level of remaining waste slurry within the conditioning means reaches a predetermined level, whereby failure of the recycle pump is prevented. The system may further comprise processing means for processing the removed waste slurry to produce a plurality of organic materials.

A method for managing a waste produced from an animal confinement housing with a waste management system is also disclosed. The method comprises the steps of flushing the waste from the animal confinement housing with a flushing material at a flush rate to produce a waste slurry having a plurality of coarse solids contained therein, separating the coarse solids from the waste slurry to produce a coarse solids-free waste slurry, removing a volume of coarse solids-free waste slurry to produce a remaining volume of waste slurry, conditioning the remaining volume of waste slurry portion to maintain air quality in the animal confinement house, and continuously recycling the conditioned waste slurry through the waste management system at a recycle rate which is preferably at least ninety-five percent of the flush rate whereby the removed volume of waste slurry has a high concentration of solids. The step of conditioning may comprise the steps of aerating the remaining volume of waste slurry to prevent the formation of hydrogen sulfide, and adjusting the pH of the remaining volume of waste slurry to prevent the emission of ammonia. The method may further comprise the step of segregating the coarse solids-free waste slurry such that the removed volume of waste slurry is more concentrated than the remaining volume of waste slurry. The method may further comprise the step of stabilizing the flow of waste slurry through the waste management system. The waste management system comprises conditioning means, such that the step of recycling comprises pumping the conditioned waste slurry with a recycle pump, and controlling the recycle pump such that operation of the recycle pump is stopped when the level of the remaining volume of waste slurry in the conditioning means reaches a predetermined level. The method may further comprise the step of processing the removed volume of waste slurry.

These and other features of the present invention will be better understood and appreciated from the following detailed description of the following embodiments, selected for the purposes of illustration.

DETAILED DESCRIPTION

Figure 1:
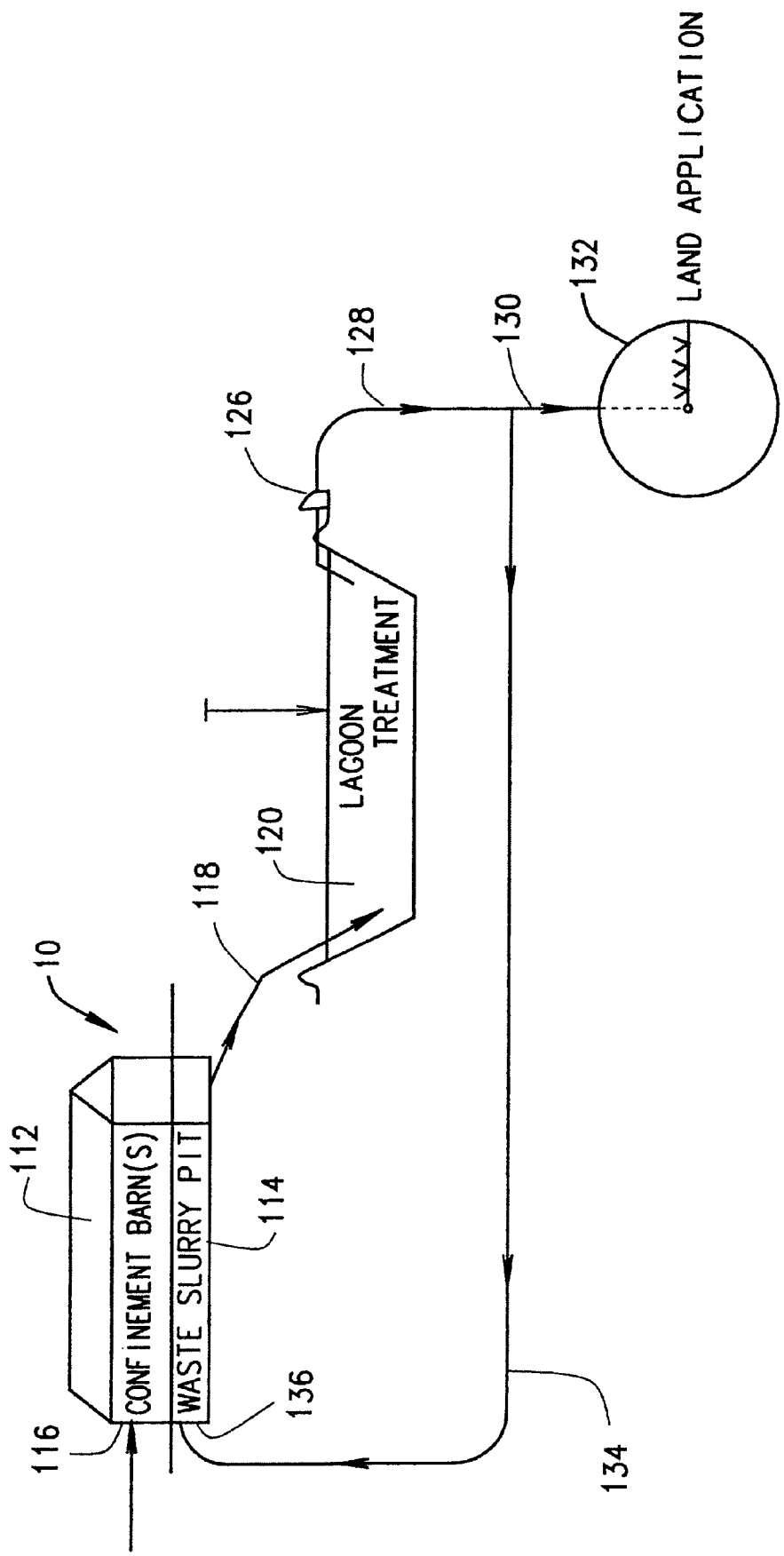
FIG. 1 is a schematic view of a conventional high volume flush system for the removal of animal waste from an animal confinement barn.

Referring now to FIG. 1 there is provided a conventional high flush waste removal system. The removal system, generally designated 10, includes a confinement structure or barn 112, having waste slurry pits 114. Fresh water is piped in through fresh water inlet 116, mixes with recycled lagoon water, discussed below, and washes through the slurry pits 114. The result is a waste slurry, typically having 0.5% total solids. The waste slurry is then directed through piping 118 into a lagoon 120, where the waste slurry is diluted to approximately 0.5% total waste solids.

A typical 8000 head grow/finish farm requires a 2–5 acre lagoon dependent on regional climate, use or disposal of treated waste, seasonal storage requirements, and demands of regulatory permits. Water is then removed from lagoon 120 by pump 126 to be recycled by piping 128, 134 back to the barn 112 through inlet 136 for further waste removal. Additionally, the diluted slurry may be diverted through piping 130 for land application 132.

Figure 2:
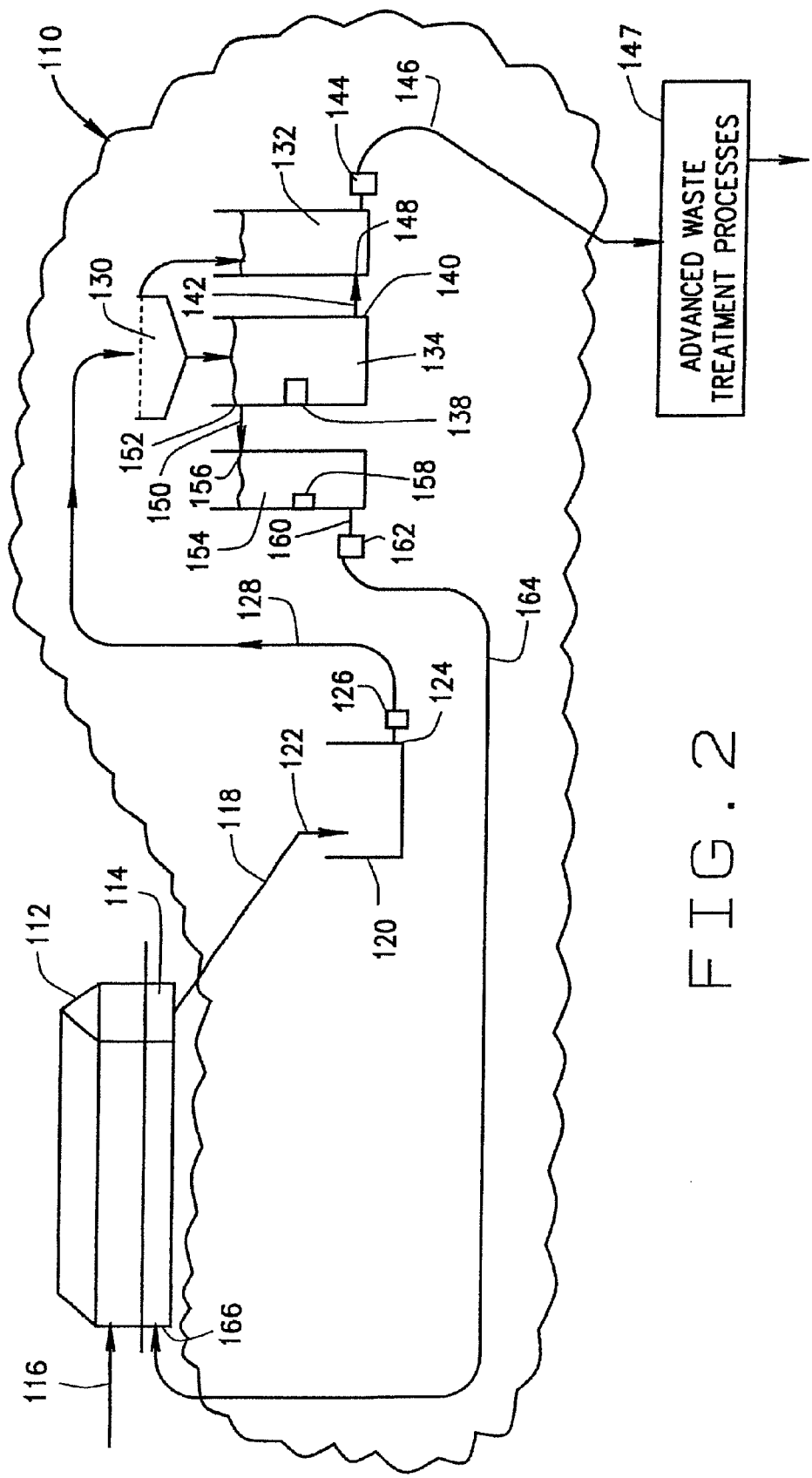
FIG. 2 is a schematic view of the hog waste management system of the present invention.

Referring now to FIG. 2, there is provided a preferred embodiment of a waste management system of the present invention. The waste management system, also known as an internal recirculation system, is described in connection with an 8000 head hog animal confinement facility for illustration purposes only, as the system can be utilized with any size facility and for any livestock producing waste. While a preferred system is shown retrofit onto an existing high flush waste management system, it can be appreciated by one skilled in the art that the system can be utilized in new construction.

The hog waste management system 110 of FIG. 2 is illustrated in conjunction with an animal confinement housing 112 such as a barn, having a waste removal system utilizing waste slurry pits 114. The flow of fresh water 116, preferably at a rate of approximately 15 gallons per minute (gpm), is provided to water, clean and cool the livestock. A mixture of the fresh water 116, and recycled waste slurry, which enters the system at 166, as discussed below, is combined to wash the animal waste products from the slurry pits 114, preferably at a rate of approximately 200–400 gpm. The resulting effluent is herein designated the waste slurry.

The waste slurry is directed through piping 118 and received into a wet well or surge tank 120 through surge tank inlet 122. The surge tank 120 acts to stabilize the system flow. A minimum 12-hour capacity, as calculated from the fresh water input is preferred. The waste slurry is then pumped from the surge tank 120 by pump 126 through surge pump outlet valve 124 into piping 128 at a rate substantially equal to the rate of flushing. In the presently preferred embodiment pump 126 is a chopper pump, thereby reducing the binding effect upon the system of the fibrous materials contained within the waste slurry.

The waste slurry is then processed through a mechanical screen 130 to remove the coarse solids contained therein, thereby preventing clogging of system 110. In a preferred embodiment, screen 130 is a circular screen separator having an 80-mesh size, which results in approximately 10–30% of the suspended solid waste being removed from the waste slurry by screen 130. It can be appreciated, however, that other methods of separation, including but not limited to alternative mechanical screen devices, hydrocyclones, thickeners, and settling cones may be effectively utilized.

The waste slurry then advances to a gravity sedimentation tank 134, which preferably holds 3,000 gallons of waste slurry. The tank 134 is used to split the waste slurry passed therethrough into two components. The first component consists of a slurry of the finer solids, which were not removed by screen 130. This portion of the slurry settles toward the bottom of sedimentation tank 134. Therefore, the waste slurry near the bottom of tank 134 is more concentrated as to total solids than the waste slurry near the top of tank 134. The design of tank 134 minimizes accumulation of solids.

Sedimentation tank 134 preferably includes a level control 138. When the level of the waste slurry in tank 134 reaches a preset level as determined by level control 138, sedimentation tank outlet valve or pump 140 allows the concentrated waste slurry to flow through piping 142 into a slurry tank 132 at a rate roughly equivalent to the volume of fresh water input to the animal confinement housing 112, in this case 15 gpms. With such a configuration, the hydraulic equilibrium of system 110 is maintained. If desired, coarse waste removed by screen 130 may also be directed to slurry tank 132 to be mixed with the waste slurry contained therein, thereby resulting in a waste slurry of approximately 4–8% total solids. In systems where water conservation equipment is used, for example swinging waterers to reduce animal spillage, the total solids concentration can reach 11% with animals nearing market weight. In cases where the screened solids are mixed into the slurry tank 132, sufficient agitation of slurry tank 132 to prevent a buildup of solids must be provided. Otherwise, coarse solids can be handled separately. The determination as to whether or not to reintroduce the coarse solids is typically made based on the ultimate use of the waste slurry, as the coarse and fine solids have different nutrient levels.

The resulting concentrated waste slurry in tank 132, typically 3–8% total solids, may be advanced through piping 146 by pump 144 to one or more advanced treatment facilities 147 which includes chemical, biological, and thermal process technologies to produce methane, fertilizers, animal feeds, liquid fuels, waste incineration, inorganic products and additional organic products.

The second component of the waste slurry advanced to gravity sedimentation tank 134 (i.e., the less concentrated slurry near the upper portion of the tank 134) comprises the primary flow from tank 134. The waste slurry is advanced through sedimentation tank outlet valve 152 through piping 150, to an inlet 156 of a conditioning tank 154. Any aeration, pH regulation, or other necessary processes are carried out in conditioning tank 154. The degree of waste slurry conditioning required is determined in part by air quality considerations within the animal confinement housing 112. Partial aeration of the waste slurry is used to prevent the formation of hydrogen sulfide. Under normal circumstances, the formation of hydrogen sulfide should not be a problem, as the fluid should be no more than a few hours old at any one time, and since the open tank discharges of the recycling system inherently provides partial aeration of the waste slurry. This results in an air quality in the animal confinement area which is at least as good as conventional flush systems, and is a significant improvement over other conventional methods. In a preferred embodiment, conditioning tank 154 is approximately the same size as sedimentation tank 134 (i.e., 3,000 gallons). In an alternative embodiment, a one tank design may be implemented, wherein the slurry is conditioned in the sedimentation tank.

The pH of the recycle waste slurry must be maintained below a pH of approximately 8.0, but preferably in the range of pH 7.5–8.0 to avoid the emission of excess ammonia. The pH is regulated by the addition of acid to the waste slurry in conditioning tank 154. While sulfuric acid is presently preferred because of its low cost and the lack of formation of secondary products, any industrial acid can be used. Further processing of the waste slurry in tank 154, including but not limited to equalization, coagulation and or flocculation may be accomplished at this time as desired. The conditioning tank 154 also preferably includes a level indicator 158 to protect the pumping system without constant human monitoring The level indicator 158 is configured so that in the event that the slurry level in tank 154 drops to a level at which any pump could be damaged by inadequate flow, the pumping system is automatically shut down.

The conditioned slurry is advanced through conditioning tank outlet valve 160 through piping 164 connected between tank 154 and barn 112 by pump 162 to barn 112 at a rate which when combined with fresh water 116, provides the necessary flow required by system 110. In this case, the 200–400 gpm required by system 110 is met by the 15 gpm of fresh water 116 and 385 gpm of recycled conditioned waste slurry from the conditioning tank 154.

From the foregoing description those skilled in the art will appreciated that all of the objects of the present invention are realized. The waste management system of the present invention provides an end product waste slurry which is consistent, easy to pump and of the concentration required for the slurry to be processed by advanced waste treatment technologies. The total volume of water and size of containment vessels needed to operate the flush system are at the same time significantly reduced. Further, the waste system of the present invention can be easily and economically retrofit a conventional existing high volume flush or pull plug system. Under optimum conditions, the system can decrease effluent volume by up to 30 fold. In addition, problems due to salt accumulation are virtually eliminated. When used as a stand alone system, the present invention requires reduced capital and operating costs.

The invention provides the livestock industry access to advanced waste treatment technologies previously unavailable due to the high volumes of dilute waste produced by existing practices. Also, the waste slurry can be treated during recycling to control any potential degradation of air quality in the animal confinement barns. Finally, the system inherently requires little human oversight, due to the constant flow system and level indicator pump protection within the tanks.

While a specific embodiment has been shown and described, many variations are possible. While the waste removal system has been described in connection with hog farming, the system would be applicable to waste removal from other types of animal or livestock facilities, including but not limited to poultry, cattle and sheep, with few if any modifications.

Also, while the system of the present invention has been illustrated for use with high flush systems, the present invention could also be retrofit onto other conventional waste removal systems, including pull plug systems.

Finally, although direct coupling of the recycling system of the present invention to advanced processing facilities obviates the need for a lagoon, the present system can be coupled to an ambient temperature anaerobic lagoon if desired. If such a configuration is used, the screened coarse product could be composted or used directly as manure fertilizer. Farm odors would be reduced by decreasing lagoon loadings, reduced odors from the confinement housing and decreased land application of liquid waste.

Having described the invention in detail, those skilled in the art will appreciate that modifications may be made of the invention without departing from its spirit. Therefore, it is not intended that the scope of the invention be limited to the specific embodiments described. Rather, it is intended that the scope of the invention be determined by the appended claims and their equivalents.

What is claimed is:

1. An animal waste management system for handling a waste slurry having a plurality of coarse solids contained therein flushed from an animal confinement housing at a flush rate, comprising:

separation means for separating the coarse solids from the waste slurry flushed from the animal confinement housing;

removal means for removing a volume of the waste slurry produced from the separation means to produce a remaining volume of waste slurry;

conditioning means for conditioning the remaining volume of waste slurry from the removal means to maintain air quality in the animal confinement housing; and recycling means for recycling the conditioned waste slurry through the waste management system at a recycle rate, whereby the removed volume of waste slurry has a high concentration of solids;

wherein the removal means comprises sedimentation means to segregate the waste slurry produced by the separation means such that the removed volume of waste slurry is more concentrated that the remaining volume of waste slurry;

wherein the sedimentation means is a tank having a lower region and an upper region in which the remaining waste slurry is segregated such that the removed volume of waste slurry is allowed to settle toward the bottom region of the sedimentation tank;

and further wherein the sedimentation means comprises:
a controller having a predetermined control level; and
a valve or pump in communication with the controller, the valve or pump being adapted to open when the level of the remaining waste slurry in the tank is equal to or greater than the predetermined control level and to close when the level of the remaining waste slurry in the tank is less than the predetermined control level.

2. The waste management system of claim 1, wherein the separation means is selected from the group consisting of a screen, a hydrocyclone, a chemical thickener, and a settling cone.

3. The waste management system of claim 1, wherein the conditioning means comprises:
an aerator adapted to aerate the remaining volume of waste slurry to prevent the formation of hydrogen sulfide; and
a regulator adapted to regulate the pH of the remaining volume of waste slurry to prevent the emission of excess ammonia.

4. The waste management system of claim 1, further comprising means for mixing the coarse solids separated by the separation means with the removed volume of waste slurry.

5. The waste management system of claim 1, wherein the removal means is a valve or pump in communication with the lower region of the sedimentation tank.

6. The waste management system of claim 1, wherein the recycle rate is at least approximately ninety-five percent of the flush rate.

7. The waste management system of claim 1, further comprising a stabilizer in communication with the recycling means and the separation means, the stabilizer being adapted to stabilize the flow of waste slurry though the waste management system.

8. The waste management system of claim 1, further comprising processing means for processing the removed waste slurry to produce a plurality of organic materials.

9. An animal waste management system for handling a waste slurry having a plurality of coarse solids contained therein flushed from an animal confinement housing at a flush rate, comprising:
separation means for separating the coarse solids from the waste slurry flushed from the animal confinement housing;
removal means for removing a volume of the waste slurry produced from the separation means to produce a remaining volume of waste slurry;
conditioning means for conditioning the remaining volume of waste slurry from the removal means to maintain air quality in the animal confinement housing; and
recycling means for recycling the conditioned waste slurry through the waste management system at a recycle rate, whereby the removed volume of waste slurry has a high concentration of solids;
wherein the recycling means comprises a recycle pump, and the conditioning means comprises a controller in communication with the recycle pump, the controller being adapted to stop operation of the recycle pump when the level of remaining waste slurry within the conditioning means reaches a predetermined level, whereby failure of the recycle pump is prevented.

10. An animal waste management system for handling a waste slurry having a plurality of coarse solids contained therein flushed from an animal confinement housing at a flush rate, comprising:
separation means for separating the coarse solids from the waste slurry flushed from the animal confinement housing;
removal means for removing a volume of the waste slurry produced from the separation means to produce a remaining volume of waste slurry;
conditioning means for conditioning the remaining volume of waste slurry from the removal means to maintain air quality in the animal confinement housing; and
recycling means for recycling the conditioned waste slurry through the waste management system at a recycle rate, whereby the removed volume of waste slurry has a high concentration of solids;
wherein the amount of solids in the removed waste slurry is in the range of approximately four to eight percent.

11. A method for managing a waste produced from an animal confinement housing, with a waste management system comprising:
flushing the waste from the animal confinement housing with a flushing material at a flush rate to produce a waste slurry having a plurality of coarse solids contained therein;
separating the coarse solids from the waste slurry to produce a coarse solids-free waste slurry;
removing a volume of coarse solids-free waste slurry to produce a remaining volume of waste slurry;
conditioning the remaining volume of waste slurry portion to maintain air quality in the animal confinement house; and
continuously recycling the conditioned waste slurry through the waste management system at a recycle rate whereby the removed volume of waste slurry has a high concentration of solid;
wherein the recycle rate is at least approximately ninety-five percent of the flush rate.

12. The method of claim 11, wherein the step of conditioning comprises the steps of:
aerating the remaining volume of waste slurry to prevent the formation of hydrogen sulfide, and
adjusting the pH of the remaining volume of waste slurry to prevent the emission of ammonia.

13. The method of claim 11, further comprising the step of segregating the coarse solids-free waste slurry such that the removed volume of waste slurry is more concentrated than the remaining volume of waste slurry.

14. The method of claim 11, further comprising the step of stabilizing the flow of waste slurry through the waste management system.

15. The method of claim 11, further comprising the step of processing the removed volume of waste slurry.

16. A method for managing a waste produced from an animal confinement housing, with a waste management system comprising:
flushing the waste from the animal confinement housing with a flushing material at a flush rate to produce a waste slurry having a plurality of coarse solids contained therein; separating the coarse solids from the waste slurry to produce a coarse solids-free waste slurry;

removing a volume of coarse solids-free waste slurry to produce a remaining volume of waste slurry;

conditioning the remaining volume of waste slurry portion to maintain air quality in the animal confinement house; and continuously recycling the conditioned waste slurry through the waste management system at a recycle rate whereby the removed volume of waste slurry has a high concentration of solids;

wherein the waste management system comprises conditioning means, and wherein the step of recycling comprises the steps of:

pumping the conditioned waste slurry with a recycle pump; and controlling the recycle pump such that operation of the recycle pump is stopped when the level of the remaining volume of waste slurry in the conditioning means reaches a predetermine level.

17. The method of claim 16, wherein the step of conditioning comprises the steps of:

aerating the remaining volume of waste slurry to prevent the formation of hydrogen sulfide, and adjusting the pH of the remaining volume of waste slurry to prevent the emission of ammonia.

18. The method of claim 16, and further comprising the step of segregating the coarse solids-free waste slurry such that the removed volume of waste slurry is more concentrated than the remaining volume of waste slurry.

19. The method of claim 16, wherein the recycle rate is at lest approximately ninety-five percent of the flush rate.

20. The method of claim 16, and further comprising the step of stabilizing the flow of waste slurry through the waste management system.

21. The method of claim 16, and further comprising the step of processing the removed volume of waste slurry.

* * * * *